United States Patent [19]

Heinze

[11] 4,089,119
[45] May 16, 1978

[54] PROCESS AND DEVICE FOR THE THERMAL TREATMENT OF A MIXTURE OF FINELY DIVIDED SOLIDS AND GASES

[75] Inventor: Christoph Heinze, Burghausen, Salzach, Germany

[73] Assignee: Hoechst Aktiengesellschaft, Frankfurt am Main, Germany

[21] Appl. No.: 592,115

[22] Filed: Jul. 1, 1975

[30] Foreign Application Priority Data

Jul. 6, 1974 Germany .............................. 2432627

[51] Int. Cl.² ............................................. F26B 3/10
[52] U.S. Cl. ...................................... 34/10; 34/57 E; 302/30; 302/46
[58] Field of Search ....................... 34/57 A, 57 E, 10; 432/14, 15, 58; 302/30, 46, 52

[56] References Cited

U.S. PATENT DOCUMENTS

| | | | |
|---|---|---|---|
| 1,747,740 | 2/1930 | Smith | 34/171 |
| 2,363,281 | 11/1944 | Arnold | 34/57 E |
| 2,538,833 | 1/1951 | De Rycke | 34/10 |
| 2,911,730 | 11/1959 | Schaub et al. | 34/57 E |
| 3,068,584 | 12/1962 | Schaub et al. | 34/57 E |
| 3,364,589 | 1/1968 | Muller | 34/57 E |
| 3,423,840 | 1/1969 | Beeken | 34/171 |
| 3,518,777 | 7/1970 | Kono | 34/57 E |
| 3,526,483 | 9/1970 | Deussner et al. | 34/57 E |
| 3,834,860 | 9/1974 | Fukuda et al. | 34/57 E |

FOREIGN PATENT DOCUMENTS 541,734 12/1941 United Kingdom .................... 34/57

Primary Examiner—John J. Camby
Assistant Examiner—Larry I. Schwartz
Attorney, Agent, or Firm—Connolly and Hutz

[57] ABSTRACT

Mixtures of finely divided solids and gases are subjected to a thermal treatment by feeding the optionally heated gas tangentially into the lower section of an axially symmetrical vessel, adding the solid to the gas at the latest in the vessel, heating or cooling the mixture of solid and gas in the vessel through the wall thereof and discharging the mixture in the upper section of the vessel. The gas/solid mixture is conducted in the vessel in upward direction in at least two annular flows substantially closed in themselves and in horizontal position one above the other, the transport of the solid from one annular flow to the adjacent overlaying annular flow taking place in a concentric inner zone of the annular flows. The device used is provided with a jacket with heating or cooling means over at least part thereof, at least one tangential inlet and outlet in the lower and upper part of the vessel and in the interior between the inlet and outlet at least one annular baffle plate is closely fitted on the wall of the vessel.

10 Claims, 11 Drawing Figures

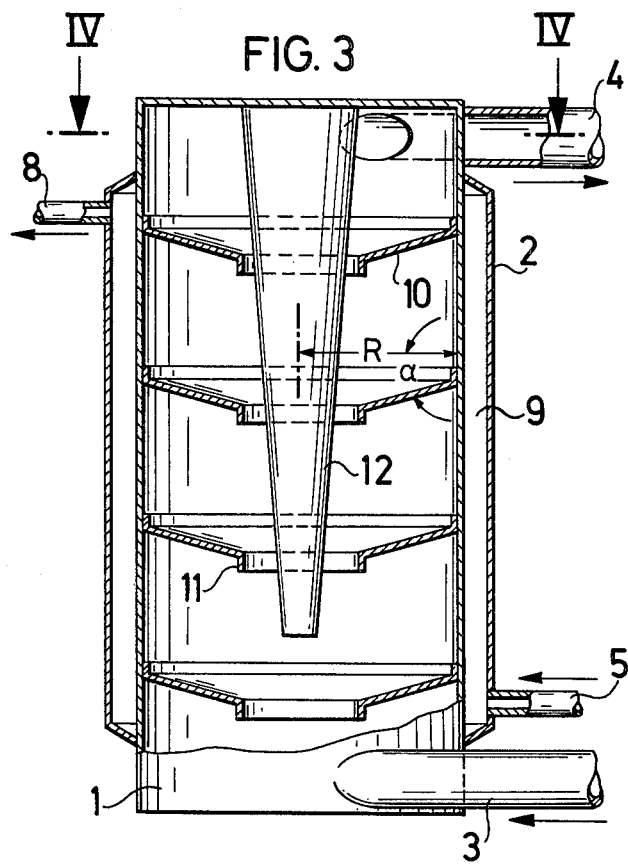
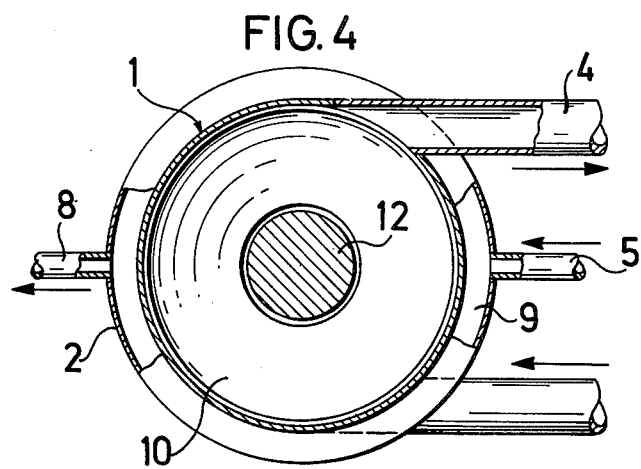

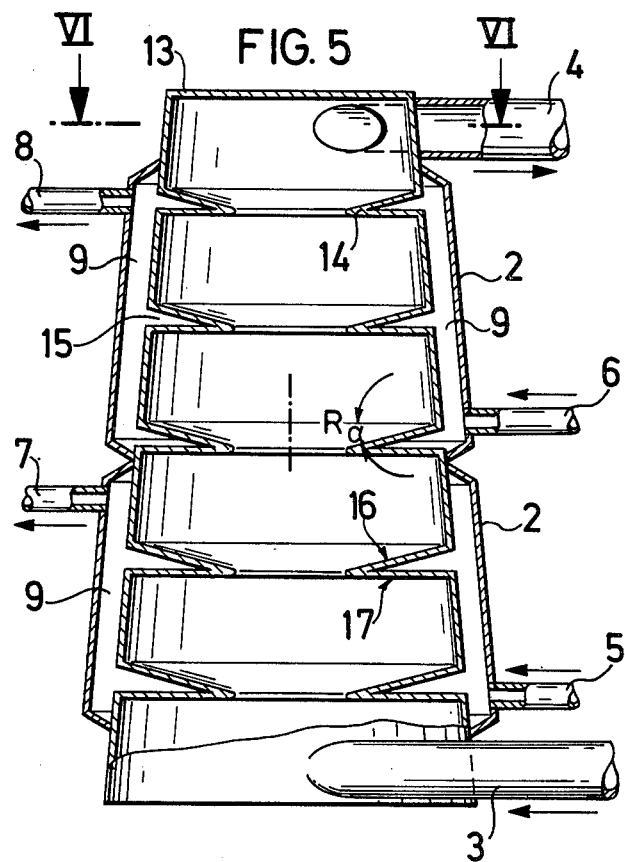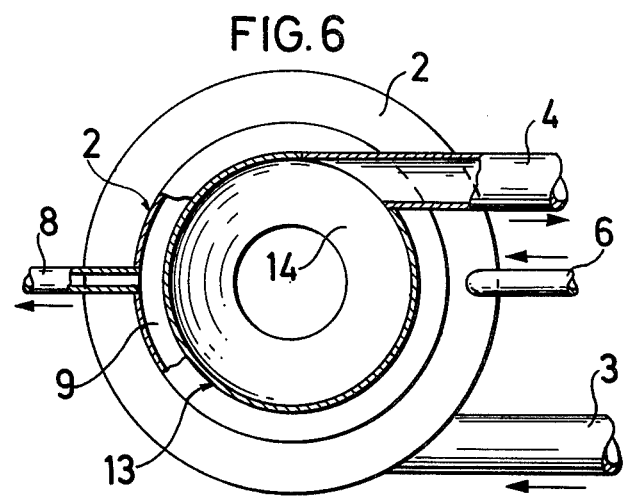

V-V

PROCESS AND DEVICE FOR THE THERMAL TREATMENT OF A MIXTURE OF FINELY DIVIDED SOLIDS AND GASES

This invention relates to a process and a device for the thermal treatment over prolonged periods of time and while intimately mixing temperature sensitive finely divided solids and gases.

The known pneumatic conveying driers described in "Aufbereitungstechnik" volume 12 (1971), pages 605 - 609 have high drying capacities. Within short residence times of a few seconds the materials to be dried are subjected to high air temperatures which may be considerably above the temperature at which the material is damaged. The drying air and the solid particles have the same velocity of flow. Variations of the residence time in dependence on the particle size are not possible. Longer residence times can be achieved only by series connecting a plurality of conveying driers which require much space. A classification of the particles is not possible.

Circulating air driers as described by F. Kneule in "Das Trocknen", 2nd edition (1968), pages 208 - 209 require high air speeds to prevent larger particles from depositing in the zones near the wall of the lower part of the whirling chambers. In this case the danger exists that, inspite of the high velocities of flow, larger particles having a relatively high density do not leave especially the last whirling chamber with the most narrow orifice and that they accumulate to a gradually growing ballast and are thermally damaged. A classification of the particles is possible.

Neither the pneumatic conveying drier nor the circulating air drier allow to prolong the residence time of the product to be dried. Heat can be supplied to or dissipated from the product by convention or by contact with the wall of the drier.

For longer residence times of thermally sensitive material the fluidized bed drier as described in Ullmann's Enzyklopadie der technischen Chemie, 4th edition (1972), page 711 is best suited so far. In this system the throughput of solid is not influenced by the rate of flow of air. However, with long residence times high amounts of air are required. The drier occupies a large space and no classification effect can be obtained. Moreover, the dry air cannot be circulated as entrained finest solid particles would deposit on the preforated inlet bottom for the air and gradually clog it.

It is an object of the present invention to provide a process for a prolonged thermal treatment of mixtures of finely divided solids and gases under readily controlled temperature conditions, wherein the optionally heated gas is tangentially introduced into the lower part of an axially symmetrical vessel, the solid is added to the gas at the latest in the vessel, the mixture of solid and gas is heated through the wall of the vessel and discharged from the upper part of the vessel, which comprises conducting the solid-containing gas current in the vessel in upward direction in at least two annular flows substantially closed in themselves and one above the other in horizontal position, the transport of the solid from one annular flow to the adjacent overlaying flow taking place in a concentric inner zone of the said annular flows.

Due to the upward transport of the material not only the centrifugal force but also the gravity bring about a classification of the particles. The gaseous phase and the solid particles stream upward at different speed. By enlarging or diminishing the inner zone of the annular flows, in which the transport of the solid takes place, the velocity of the upward flow parallel to the axis of the gaseous phase can be influenced in a manner such that a very good classification effect and therewith a very favorable residence time of the solid particles is obtained.

During its course through the vessel the solid containing gas mixture can be heated in some zones by contact with the wall of the vessel, in others it can be cooled. The cooling may serve the purpose to avoid a thermal damage of the particles with longer residence times, for example when the thermal treatment is started at high and continued at moderate temperature.

To improve the effect of the process of the invention the solid-containing gas mixture is advantageously conducted in more than 2, for example 3 - 31 annular flows one above the other in horizontal direction. The number of said annular flows is limited by the internal resistance to flow of the vessel. If it should be necessary to continue the process of the invention it is generally more advantageous tangentially to discharge the solid-containing gas mixture after it has passed about 31 annular flows and to treat the mixture in one or more further temperature controlled vessels.

According to a preferred embodiment of the process of the invention the mixture is treated in a vessel with 6 to 16 annular flows.

The solid used in the process of the invention shall have a mean particle size of from 1 to 10,000 microns, preferably from 10 to 4,000 microns, the best results being obtained with a mean particle size in the range of from 20 to 1,000 microns.

If the solid should contain individual larger particles which would not be transported by the gas current to the head of the vessel, the bottom of the vessel is advantageously provided with optionally cooled depositing means, from which the particles can be discharged continuously or discontinuously. The discharged particles can be comminuted and/or recycled discarded. This additional effect of the vessel as air sifter can be further improved by adding the finely divided solid above the gas entrance at the height of the second, third, or fourth annular flow.

Suitable gases are, for example, air, nitrogen, carbon dioxide, carbon monoxide, steam, hydrogen, and vapors of readily volatile organic solvents, for example aliphatic hydrocarbons having from 1 to about 8 carbon atoms, which can be wholly or partially substituted by chlorine or fluorine, aliphatic alcohols having from 1 to about 6 carbon atoms, aliphatic ethers, ketones, esters having from 3 to about 6 carbon atoms, aromatic hydrocarbons having from 6 to about 8 carbon atoms, or mixtures of the aforesaid gases and vapors.

Air or steam or a mixture thereof is preferably used for freeing difficultly combustible or noncumbustible solids from volatile impurities, while nitrogen or steam or a mixture thereof is used for the treatment of readily combustible substances, especially substances which easily acquire an electric charge.

The process of the invention is preferably used for freeing finely divided solids containing 60 to almost 100% by weight of organic high polymers from volatile substances contained therein. Especially good results are obtained with finely divided solids containing 50 to almost 100% by weight of polymerized vinyl chloride.

A further field of application is, for example, the catalytic purification of air containing solvent vapors with finely divided solid catalyst particles.

The velocity of flow of the gas when it enters the first vessel depends inter alia on the resistance of flow in the vessel, the particle size distribution and the density of the solid used and the desired residence time of the solid in the vessel. The velocity of flow is suitably in the range of from about 1 to about 100 meters per second preferably 5 to 20 meters per second.

It is a further object of this invention to provide a device for carrying out the aforesaid process comprising a vessel with axially symmetrical interior, a jacket having means for heating and cooling over at least part of its area and at least one tangential inlet and outlet in the lower and in the upper part, wherein in the interior of the vessel between the inlet and outlet at least one annular baffle is closely fitted on the wall of the vessel.

The axially symmetrical interior of the vessel can have the shape of a normal or an inverted truncated cone, preferably, however it is cylindrical and may be composed of several cylindrical elements one above the other and having different diameters.

In the interior of the vessel 2 to 30 and more particularly 5 to 18 annular baffle plates are preferably mounted one above the other.

The annular baffle plates can be installed at varying distances. In a preferred embodiment all annular baffle plates in the interior of the vessel are at equal distance from one another, the distance preferably amounting to 0.1 to 1 time and more preferably 0.2 to 0.6 time the largest inner diameter of the vessel.

In order to avoid deposits of the material to be treated the annular baffle plates are preferably inclined radially towards the axis of the vessel. Around the orifice the annular baffle plate can be provided with a small cylindrical collar. The angle of inclination of the annular baffle plate with respect to the radius of the vessel can vary from one baffle plate to the other, preferably, however, it is equal for all baffle plates in a vessel. It is in the range of from 1° to 45°, advantageously 5° to 20°. The orifice of each annular baffle plate should have a free cross sectional area of 10 to 90%, preferably 15 to 40% of the free cross section of the vessel at the point of fitting of the respective baffle plate.

The means for heating and/or cooling the wall of the vessel are suitably arranged in horizontal annular zones of the wall in a manner such that the beginning or the end of a zone is at the same level with an annular baffle plate in the interior of the vessel. The surface of the annular baffle plate positioned at the point of transition of two zones of different temperature is preferably provided with a heat insulation.

One or several annular baffle plates may also be provided with means for cooling and/or heating which may be connected with the corresponding means on the wall of the vessel.

Between the tangential inlets and outlets in the lower and upper part of the vessel further inlets can lead into the vessel also tangentially at different heights of the vessel for the introduction of gas and/or finely divided solid.

The bottom of the vessel may have a conical shape and contain an outlet for the particles which, under the chosen operating conditions, are not discharged with the gas at the head of the vessel.

According to a preferred embodiment the vessel has a cylindrical interior, the orifices of the annular baffle plates have all the same free cross sectional area and in the vessel a concentric displacement body is provided for the diameter of which amounts to about 10 to 90% and preferably 30 to 60% of the cross sectional diameter of the orifices of the annular baffle plates. The displacement body preferably has a cylindrical shape, but may also taper towards the upper or lower end.

As compared with a fluidized bed drier, for example, the device according to the invention has a considerably improved efficiency and permits a continuous thermal treatment of mixtures of solids and gases with a residence time in the range of about ½ to 60 and preferably 2 to 30 minutes. The temperature conditions can be optimized according to the requirements in each case so that an intensive and careful treatment is ensured. A further advantage resides in the fact that a classification is possible and the larger solid particles can be separated at the beginning of the thermal treatment and treated in a separate process. The required device has a relatively simple construction, it is sturdy, little liable to troubles and requires little space only.

The process of the invention can be used in many fields of application, for example for final drying, for degassing, for a simple thermal treatment.

Especially good results are obtained when volatile substances are removed, for example residual monomers, from solids consisting of 80 to about 100% by weight of organic high polymers, more especially from vinyl chloride homopolymers or copolymers with other monomers containing 50 to 100% by weight of polymerized vinyl chloride.

The invention will now be described in further detail and by way of example with reference to the accompanying drawing of which FIG. 1 is a longitudinal view of one embodiment of the device of the invention, FIG. 2 is a cross sectional view of the device of FIG. 1 along line II — II, FIG. 3 is a longitudinal view of another embodiment of the device of the invention, FIG. 4 is a cross sectional view of the device of FIG. 3 along line IV — IV, FIG. 5 is a longitudinal view of a further embodiment of the device of the invention, FIG. 6 is a cross sectional view of the device of FIG. 5 along line VI — VI, FIG. 7 is a longitudinal view of a further embodiment of the device of the invention;

Figure 1:
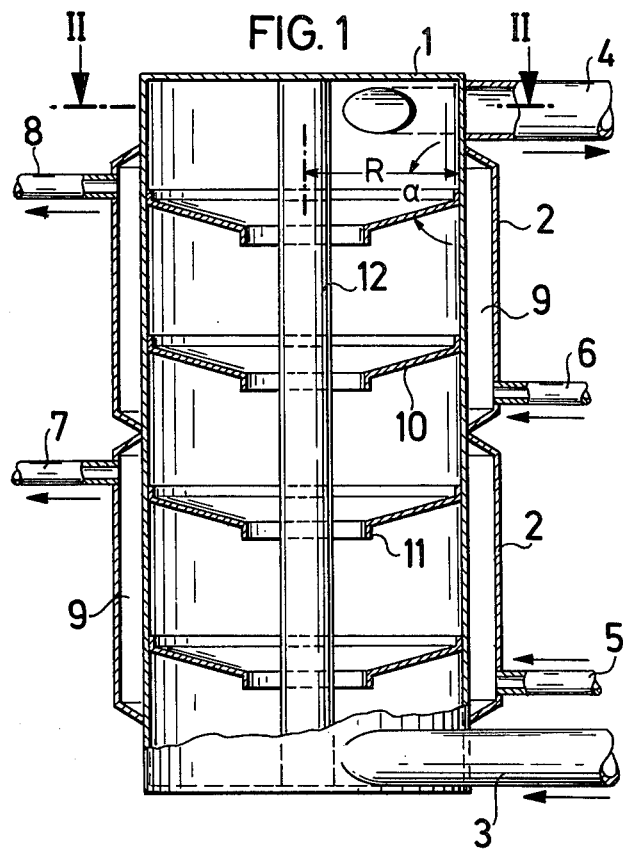
Figure 2:
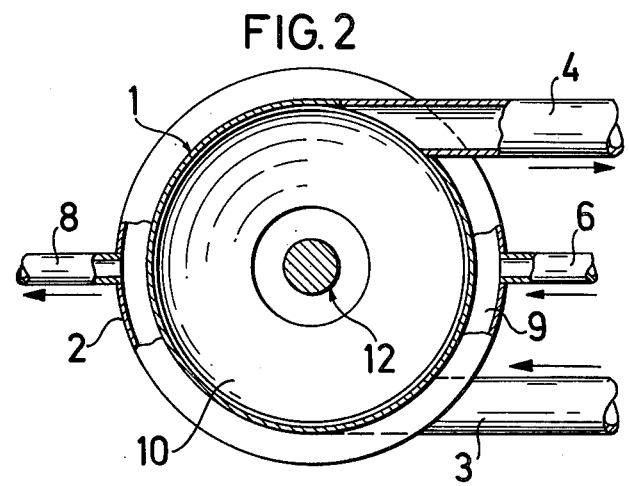

Referring now to the drawings: upright cylindrical vessel 1 with jacket 2 is provided with tangential conduits 3 and 4. Heating or cooling medium is introduced into chambers 9 formed by the wall of the vessel and the jacket 2 through tubes 5 and 6 and removed through tubes 7 and 8. In the interior of the vessel 1 annular baffle plates 10 are fitted horizontally one above the other. The baffle plates are inclined by angle $\alpha$ with respect to the radius R of the vessel 1. The center edge of the annular plates is provided with a cylindrical collar 11. The vessel further contains a concentric cylindrical displacement body 12.

In a further embodiment of the device of the invention the concentric displacement body has a conical shape (cf. FIG. 3). By this measure the cross sectional area of the orifices of the annular baffle plates in vessel 1 is diminished in upward direction whereby the velocity of flow of the mixture is increased.

The device according to FIG. 5 consists of an upright vessel 13 having the shape of a truncated cone and provided with a jacket 2. In this embodiment the baffles 14 differ from the baffle plates 10 of the devices shown in FIGS. 1 and 3. The baffle plates 14 are formed by inclined surfaces 16 and horizontal surfaces 17, with an angle of inclination $\alpha$, and the hollow space between these two surfaces is directly connected with chambers 9.

Figure 7:
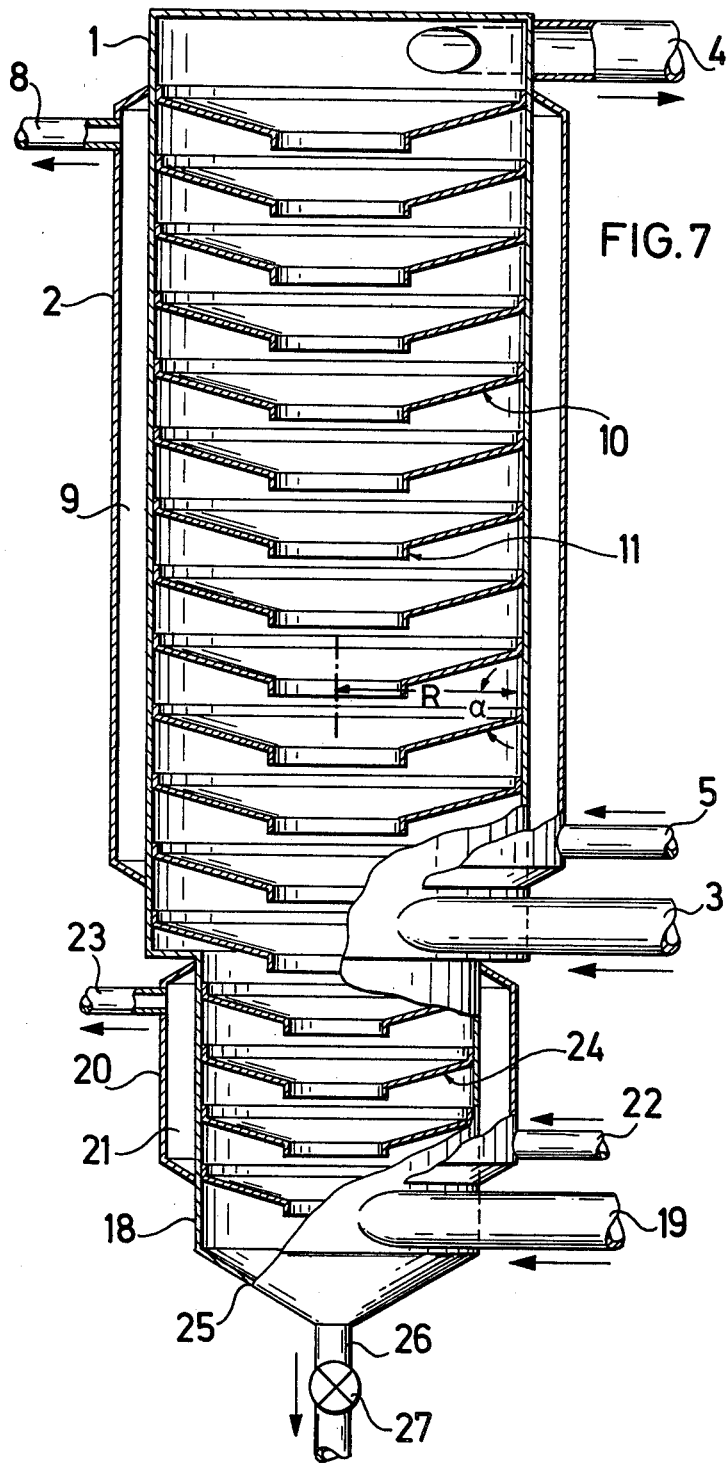

In the device shown in FIG. 7 cylindrical vessel 1 is mounted on a vessel 18 having a reduced diameter. Vessel 18 is provided with a tangential supply tube 19, a jacket 20 and conduits 22 and 23 for the introduction and removal of the heating or cooling medium. In accordance with the reduced diameter of vessel 18 the diameters of the baffles 24 and the cross sectional areas of the orifices are reduced by about 25% with respect to the baffles 10. The bottom 25 of vessel 18 has a conical shape. For discharge a tube 26 with valve or rotary valve is provided for.

Figure 10:
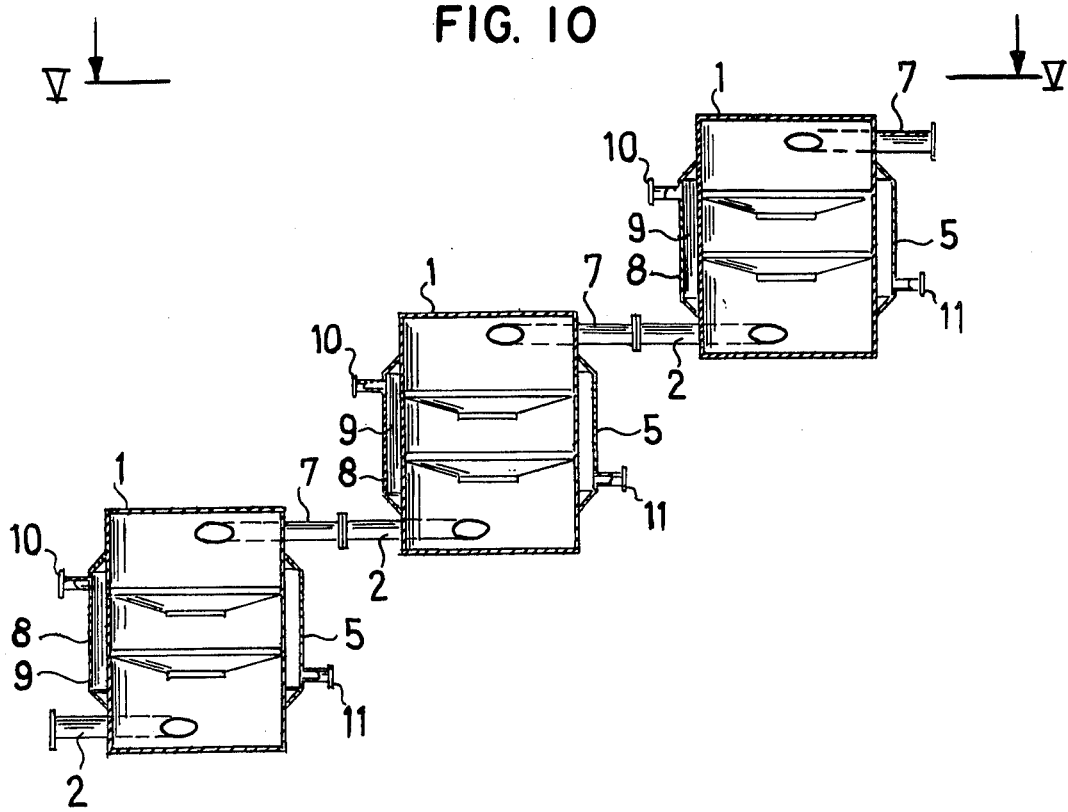
FIG. 10 is a longitudinal view of a further embodiment of a device of the invention.
Figure 11:
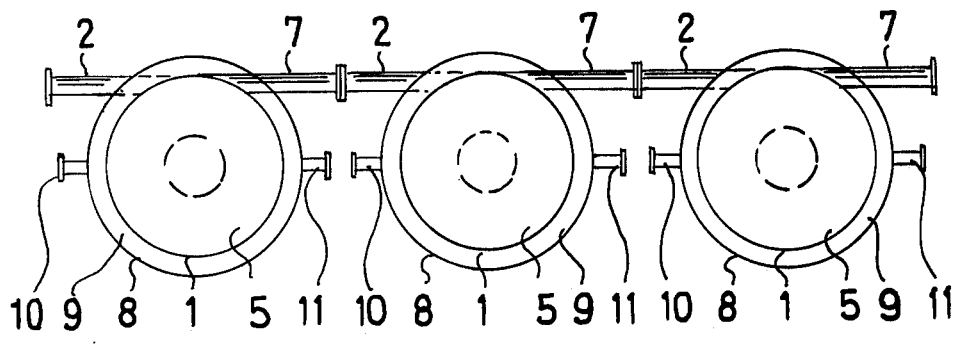
FIG. 11 is a cross-sectional view of the device of FIG. 10 along the line V — V.

The device according to FIG. 10 consists of three upright cylindrical vessels 1 with jackets 8. The vessels are provided with tangential conduits 2 and 7. Heating or cooling medium is introduced into chambers 9 formed by the walls of the vessels 1 and the jackets 8 through tubes 10, and removed through tubes 11. In the interior of the vessels 1 annular baffle plates 5 are inclined by angle $\alpha$ with respect to the radius R of the vessels 1. The three vessels are arranged one upon another so that the tangential outlet 7 of the preceding vessel is directly connected with the tangential inlet 2 of the following vessel.

Figure 9:
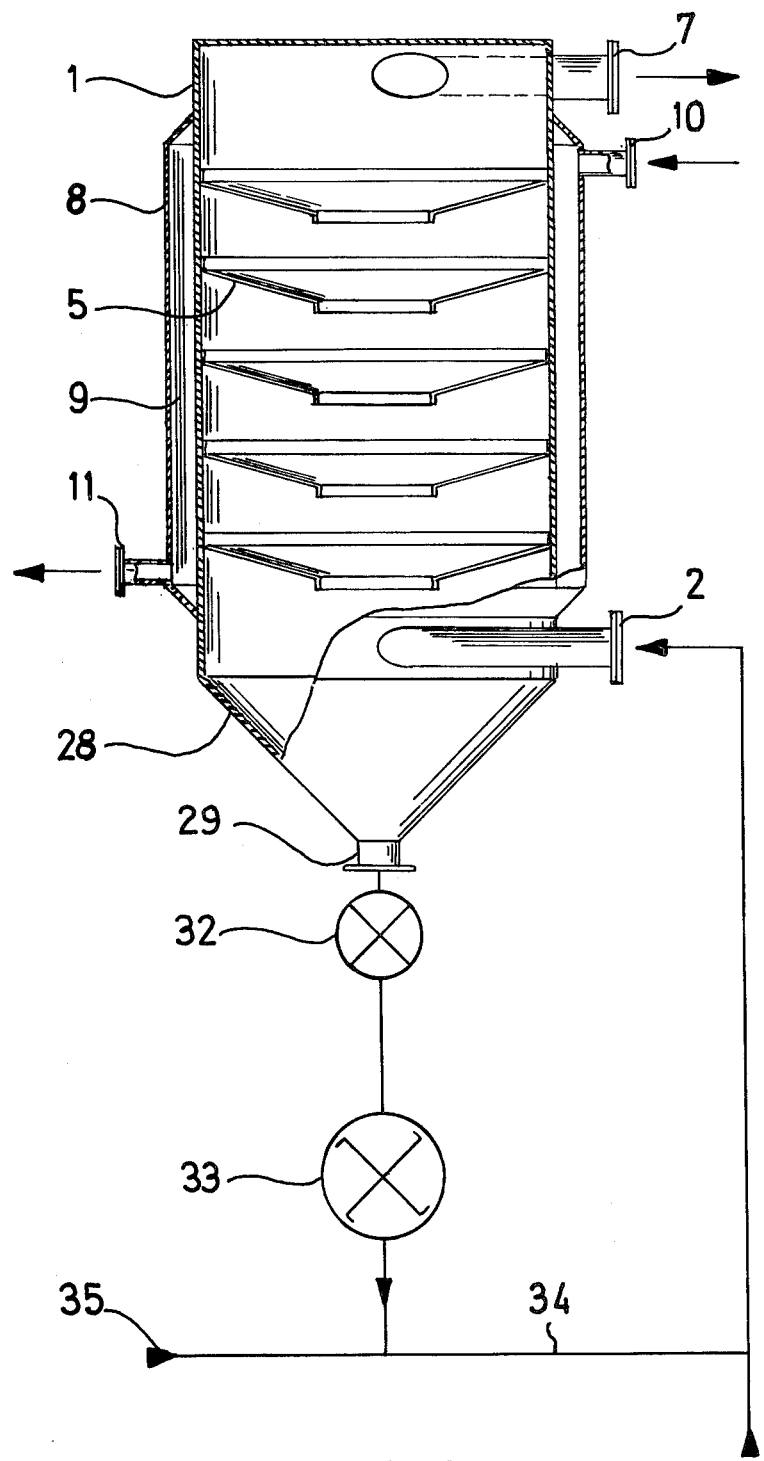
FIG. 9 is a longitudinal view of a further embodiment of a device of the invention.

The device according to FIG. 9 consists of only one upright cylindrical vessel 1 which resembles in shape one of the vessels according to FIG. 10. The members shown in FIG. 9 have the same meaning as those shown in FIG. 10. Diverging from the vessels according to FIG. 10 the vessel according to FIG. 9 has a conically shaped bottom 28 provided with a discharge tube 29 and a valve or rotary valve 32. The outlet of this valve is connected with a mill 33. The milled material which leaves this mill is recycled to the tangential inlet 2 of the vessel 1 through a tube 34 by a stream of gas which enters the mill through tube 35.

The following examples illustrate the invention.

EXAMPLE 1

A vinyl chloride hompolymer having a K value of 76, a content of monomeric vinyl chloride of 2,400 ppm, an average particle size of 110 microns and a proportion of coarse particles having a diameter above 300 microns of about 2% was substantially freed from monomeric VC and the coarse particles.

(A) According to the state of the art: the coarse particles having a diameter above 300 microns were separated over a sieve and the remaining polymer was degassed for 4 hours at an air temperature of 100° C in a fludized bed drier as described in Ullmann's Enzyklopedia (loc. cit.) having a basic surface of 2.5 m². 360 m³ of hot air and 150 kg of solid were passed through per hour. The result is indicated in Table II.

(B) According to the invention in a device as shown in FIG. 7 having the following dimensions:

TABLE I

|  | upper section of | lower vessel |
|---|---|---|
| internal diameter | 560 mm | 400 mm |
| number of annular baffles | 14 | 2 |
| diameter of baffle plate orifice | 350 mm | 300 mm |
| distance of baffle plates | 250 mm | 170 mm |
| angle of inclination $\alpha$ of the baffle plate with respect to radius R of the vessel | 15° | 20° |

500 m³ air of 80° C were blown per hour through tube 19 into lower vessel 18, while the upper container 1 was charged per hour with a mixture of 150 kg of the vinyl chloride polymer and 600 m³ air of 80° C per hour. Both containers were heated by means of water of 90° C.

The air/solid mixture left the device through tube 4 with an amount of issuing air of 1,100 m³ per hour. Air and solid were separated from each other in known manner and the warm air was recycled into the device. The removed monomeric vinyl chloride was transferred, together with 110 m³ air per hour, into a recovering device. The discharged air was replaced by fresh air.

The average residence time of the solid particles in the device was about 10 minutes. Small particles (about 30 microns) had a much shorter residence time (about 0.5 minute) than large particles having a diameter of about 250 microns which remained in the device for about 20 minutes. Particles having a diameter above 300 microns collected in the conical bottom of vessel 18 and were removed through tube 26. Screening of the polymer was not necessary.

The data found are listed in the following Table II

TABLE II

|  | Process | |
|---|---|---|
|  | A) State of the art | B) of the invention |
| monomeric vinyl chloride in treated polymer (ppm) | about 10 | about 10 |
| energy consumption (kcal/kg polymer) | 66 | 14 |
| air consumption (m³/h) | 360 | 110 |

The device according to the invention required about one-fifth of the space of the fluidized bed drier.

EXAMPLE 2

3,000 m³ (under normal conditions of pressure and temperature) of oxygen-containing exhaust gas having a temperature of 80° C and containing 5 g/m³ of organically bound carbon and dusty impurities were purified by catalytic afterburning at a temperature below 450° C.

Figure 8:
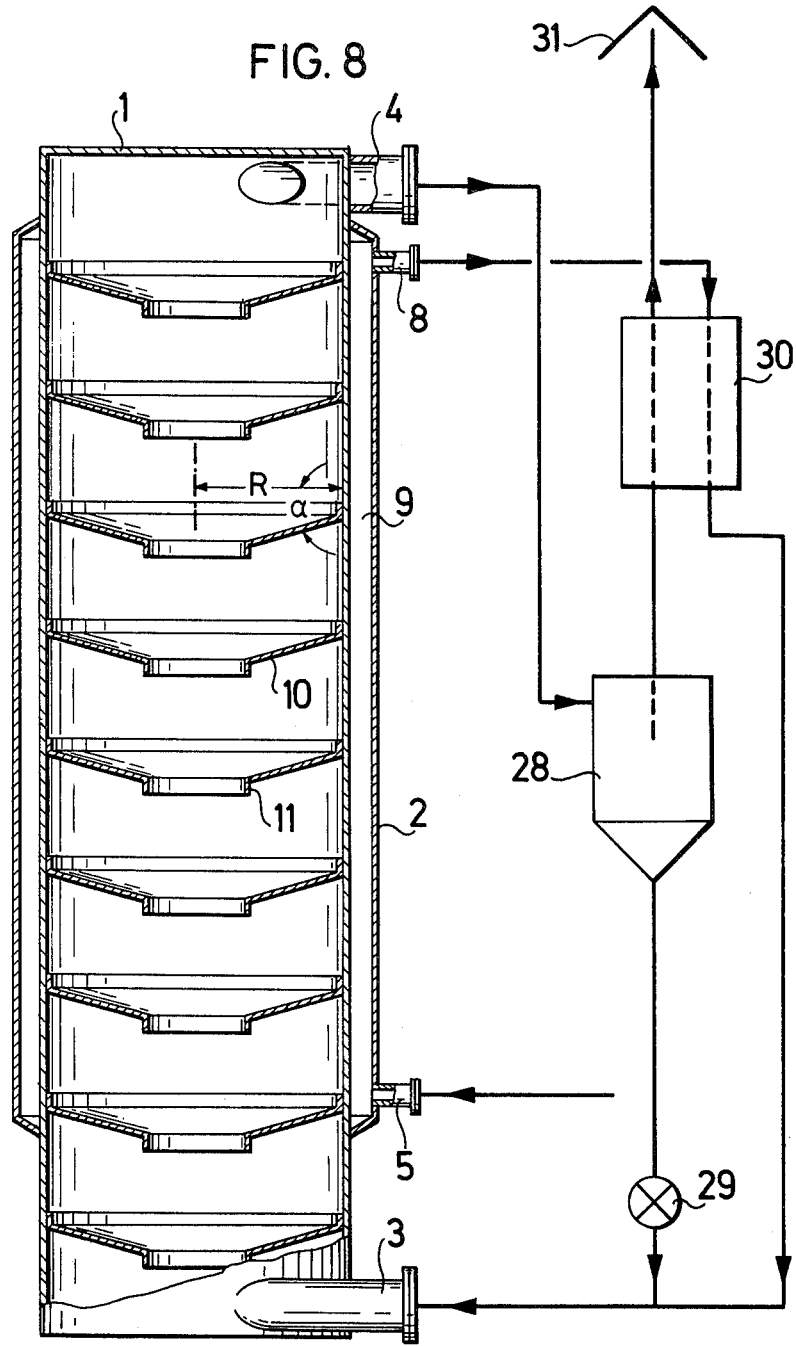
FIG. 8 is a longitudinal view of a further embodiment of the device of the invention with flow scheme.

The device used according to FIG. 8 had the following dimensions:

| internal diameter | 1,000 mm |
|---|---|
| number of annular baffles | 8 |
| diameter of baffle orifices | 550 mm |
| distance of baffles | 500 mm |
| angle of inclination $\alpha$ of baffle plate with respect to radius R | 15° |

The exhaust gas was introduced into chamber 9 through conduit 5 and left through conduit 8 at a temperature of about 145° C due to the catalytic combustion in vessel 1. The gas was conducted through heat exchanger 30 in which it was heated to the starting temperature of the catalytic reaction of about 350° C by the hot off gas. To the exhaust gas a finely divided catalyst having an average particle size of 500 microns (addition not shown) was added and the gas/solid mixture was introduced into vessel 1 through lower inlet 3 at a speed of about 17 m/sec. During the passage through the vessel the organically bound carbon was burned while the wall of the vessel was cooled. The mixture leaving the vessel through upper conduit 4 had a temperature of about 430° C. In a cyclone 28 the solid particles were separated from the gas current, which was conducted through heat exchanger 30 and discharged into the atmosphere at a temperature of about 220° C and with a residual content of organically bound carbon of about 0.5 g/m$^3$. The solid catalyst particles were again added over a dosing device 29 to the gas current to be purified.

What is claimed is:

1. In a process for thermally treating a mixture of finely divided solids and gases by feeding a stream of gas having a speed of about 1 to about 100 meters per second tangentially into a cylindrical vessel, adding the solid to the gas at the latest in the vessel, adjusting the temperature of the mixture of solid and gas in the vessel through the wall thereof, conducting the stream of gas-solid mixture in the vessel in at least two annular flow paths having the same sense of rotation substantially closed in themselves, situated in horizontal position one above the other, the improvement comprising transporting only part of the mixture flowing in one annular flow path to the above adjacent annular flow path by restricting the flow area to a concentric inner zone between the annular flows having about 15–40% of the flow area in the annular flow paths, whereby the time that the mixture flows in the annular flow path is prolonged to thus prolong the thermal treatment of the mixture and improve its classification, conducting the stream of the mixture of gas and solid in opposite direction to the gravitation to the top of the vessel and discharging at the top of the vessel in the same sense of rotation as the gas fed into the vessel at the bottom.

2. A process as claimed in claim 1, wherein the part of the solid, which consists of larger particles, which would not be transported by the gas current to the head of the vessel is discharged at the bottom of the vessel, comminuted and added again to the gas current, which enters said vessel.

3. A process as claimed in claim 1, wherein air, steam and mixtures thereof are used as gas.

4. A process as claimed in claim 1, wherein the finely divided solid has a particle size in the range of from 10 to 4000 microns.

5. In a device for thermally treating a mixture of finely divided solids and gases comprising a vessel having a cylindrical interior, a jacket with heating or cooling means over at least part thereof, at least one tangential inlet at the bottom and an outlet at the top of the vessel, inside of the vessel 2 to 30 annular baffle plates having orifices which are mounted one above the other closely fitted on the wall of the vessel between said inlet and outlet, said vessel is connected with means for producing an air stream to convey solid material from the inlet to the outlet of the vessel, the improvement comprising maintaining the cross-sectional areas of the orifices about 15 to 40% of that of the free cross-sectional area of the vessel whereby the time that the mixture flows in the annular flow paths is prolonged to thus prolong the thermal treatment of the mixture and its classification the outlet being tangential to the cylindrical wall of the vessel in the same sense of rotation as the tangential inlet of said vessel.

6. A device as claimed in claim 5, wherein the inlet of the vessel is connected with a tube comprising means for feeding finely divided solids into said tube.

7. A device as claimed in claim 5, wherein the angle of inclination of the baffle plates is from 5 to 20°.

8. A device as claimed in claim 5, wherein one or several annular baffle plates are provided with means for heating and cooling.

9. A device as claimed in claim 5, wherein the vessel is composed of a plurality of superimposed cylindrical elements of different diameters.

10. A device as set forth in claim 5, wherein the distance between the baffle plates is approximately from 0.2 to 0.6 times the largest inner diameter of the vessel.

* * * * *